Patented May 15, 1945

2,376,033

UNITED STATES PATENT OFFICE 2,376,033

KETO ESTERS

Albert M. Clifford, Stow, Ohio, assignor to Wingfoot Corporation, Akron, Ohio, a corporation of Delaware No Drawing. Application May 8, 1942,
Serial No. 442,183

7 Claims. (Cl. 260—486)

This invention relates to a novel method of producing keto esters of acrylic acids.

This application is in part a continuation of my application Serial No. 387,665, filed April 9, 1941.

The esters of this invention are prepared by reacting a metal salt of the acrylic acid with a halogen substituted ketone thereby splitting out a metal halide. The reaction is illustrated by the following equation:

$$CH_2=CH-COONa + ClCH_2-CO-CH_3 \rightarrow$$
$$CH_2=CH-COO-CH_2-CO-CH_3 + NaCl$$

The esters of acids of the acrylic series in which the carbonyl group is beta to the carboxyl group are especially easy to prepare according to the process of this invention. Compounds which may be thus prepared include alpha acetyl ethyl methacrylate, propionyl methyl methacrylate, cyclohexanonyl methacrylate, methyl cyclohexanonyl methacrylate, 1-carbethoxy acetyl methacrylate, acetyl methyl methacrylate, and benzoyl methyl methacrylate.

The halogen ketones with which the salt of an acrylic acid may be reacted according to the process of this invention include the alpha chlor substitution products of methyl isopropyl ketone, methyl butyl ketone, methyl isobutyl ketone, methyl tertiary butyl ketone (pinacoline), methyl amyl ketone and methyl isoamyl ketone. The alpha halogen-substituted derivatives of the following unsaturated ketones may also be reacted: vinyl acetone, allyl acetone, mesityl oxide, ethylidene acetone, crotonylidene acetone ($CH_3-CH=CH-CH=CH-CO-CH_3$) and methyl vinyl ketone; as well as the alpha halogen substitution products of the following di ketones: diacetyl, acetyl acetone, hexandione (acetyl propionyl methane), acetonyl acetone, and butyryl acetone. Other ketones suitable for reaction with salts of the acrylic series are the alpha halogen substitution products of cyclic ketones, such as methyl cyclohexyl ketone, isopropyl cyclohexyl ketone, camphor, acetophenone, benzyl phenyl ketone, dibenzoyl methane, benzal acetone and benzoyl acetone.

The acrylates which are reacted with the foregoing halogen-substituted ketones and others like them are, in general, those which form monomeric alkali metal salts. The alpha alkyl substituted acrylic acids yield especially useful esters. Among suitable acids whose alkali metal salts may be used there may be mentioned acrylic acid, methacrylic acid, ethacrylic acid, itaconic acids

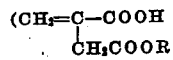

where R is a hydrocarbon substituent), cinnamic acid and alpha phenyl acrylic acid.

The method of preparing the new esters is illustrated by the following examples to which, however, the invention is not limited.

EXAMPLE 1

Acetyl methyl methacrylate

The sodium salt of the acrylic acid compound may be prepared by any of several different methods, one of which is by hydrolysis of an ester, for example, the methyl ester of the acid. Thus, a solution of 88 grams of NaOH in 800 cc. of water was added with stirring to 200 grams (2 mols) of methyl methacrylate containing 2 grams of hydroquinone. After about 40 minutes, during which time the color of the mixture deepened, solution was complete, with the exception of 22 grams of polymeric ester. Gentle heating and stirring, for 45 minute was followed by removal of the generated methyl alcohol by warming under reduced pressure. The residual solution was heated under a slow reflux and, while stirring, 184 grams (2 mols) of mono chloro acetone was added during a 30-minute period. After 50 minutes additional heating, the organic layer was separated, washed with water and dried over calcium sulfate. Then, after the addition of a further small quantity of hydroquinone, distillation was conducted under reduced pressure. The main fraction obtained amounted to 71 grams and distilled at 102–104° C. at 35 mm. pressure. The product was a water-white liquid, $n_D^{27}$ 1.4433, $d_{15}^{28}$ 1.0462; mol. ref. obs. 36, calc. 35.9.

EXAMPLE 2

(Alpha-acetyl ethyl) methacrylate

To a solution of 88 grams of NaOH in 800 cc. of water was added with cooling and stirring 200 grams of methyl methacrylate containing 2 grams of hydroquinone and 2 grams of N,N'-diphenyl para phenylenediamine. The mixture was refluxed gently for 2½ hours, solution being then being substantially complete, following which distillation at 35 mm. pressure was conducted until there was collected 191 grams of distillate containing the greater portion of the methanol generated. To the resulting acrylic solution 212 grams of 3-chloro butanone-2 was added over a period of 30 minutes, the mixtures being stirred and maintained at a temperature of 100–110° C. for a total period of 2¼ hours. The organic layer was separated, washed with saturated NaCl solution, dried and distilled. The main fraction distilled at 95–96° C. at 30 mm. and amounted to 57.5 grams. It had the following characteristics: $n_D^{27}$ 1.4346, $n_D{15}^{28}$ 0.986. Mol. ref. obs. 41.3, calc. 40.54.

EXAMPLE 3

*Propionyl methyl methacrylate*

A sodium methacrylate solution was prepared from 2 mols of methyl methacrylate in the above manner and the resulting methanol removed. To this solution was added 212 grams of 1-chlorobutanone-2 during a period of 45 minutes while stirring. The mixture was then heated with agitation on an oil bath at a temperature of 105–115° C. The organic layer was purified by distillation and a fraction isolated with B. P. 102–5° C. at 30 mm. The product had the following characteristics: $n_D^{30}$ 1.4357, $d_{15}^{29}$ 1.0168. Mol. ref. obs. 40.09, calc. 40.54.

EXAMPLE 4

*Cyclohexanonyl methacrylate*

One and one-fifth mols Na-methacrylate was prepared as in Example 2 above, and the methanol removed by fractionation. To this solution was added 158 g. 1.2 mols 2-chloro cyclohexanone with stirring over a 30-minute period. The mixture was then heated at a gentle reflux for two hours. After standing overnight the organic layer was separated, dried over CaSO₄ and distilled under reduced pressure. The main fraction boiled over a range of 45–60° C. at 5 mm. The distillate, however, polymerized very quickly, even at low temperature (5° C.). In addition to the distillate, a considerable portion remained as a polymerized, non-distillable residue.

EXAMPLE 5

*Methyl cyclohexanonyl methacrylate*

Sodium methacrylate was condensed with X-chloro-2-methyl cyclohexanone as in Example 4. From 2.65 mols of each reactant was finally obtained a fraction B. P. 52–57° C. at 7 mm. possessing the properties: $n_D^{29}$ 1.4473, $d_{15}^{29}$ 0.9915. Mol. ref. obs. 52.2, calc. 52.25.

EXAMPLE 6

*(1-carbethoxy acetonyl) methacrylate*

Condensation of sodium methacrylate (.5 mol.) with 83 grams of ethyl alpha chloro aceto acetate, was conducted in substantially the same manner as in the preceding examples. The monomeric condensation product was subjected to distillation in the presence of both hydroquinone and N,N'-diphenyl-p-phenylene diamine. Only a portion of the desired monomeric product distilled, collected in a fraction B. P. 60–80° at 8 mm. consisting in part of unchanged chloro ester. The monomer immediately polymerized and deposited as solid in the ice-cold receiver. A polymeric residue of 46 g. was non-distillable.

EXAMPLE 7

*Acetyl methyl acrylate*

Sodium acrylate solution was prepared by saponification of ethyl acrylate in presence of inhibitors in the same manner as in the preceding examples, the resulting alcohol being removed by distillation. To two mols of sodium acrylate solution thus prepared was added 184 g. chloro acetone, with stirring and final heating by a 100° C. bath for period of 1.5 hours. The organic layer was separated, dried and distilled. The main fraction amounting to 70 grams distilled at 99–101° C. and showed $n_D^{28}$ 1.4391, $d_{15}^{19}$ 1.0615. Mol. ref. obs. 31.5, calc. 31.34.

I claim:

1. The method of producing a keto ester of an acrylic acid which comprises reacting an alpha chlor ketone with an alkali metal salt of the acrylic acid in solution.

2. The method of producing a keto ester in which the carbonyl group is beta to the carboxyl group, which comprises reacting a solution of an alpha halo ketone with an alkali metal salt of an acid selected from the group consisting of acrylic, alpha alkyl substituted acrylic, cinnamic and alpha phenyl acrylic, in the presence of an inhibitor, at a temperature of about reflux, until the reaction is substantially complete, distilling the reaction mixture at a reduced pressure and recovering the keto ester.

3. The method of producing a keto ester in which the carbonyl group is beta to the carboxyl group, which comprises reacting a solution of an alpha chloro ketone with an alkali metal salt of an acid selected from the group consisting of acrylic, alpha alkyl substituted acrylic, cinnamic and alpha phenyl acrylic, in the presence of an inhibitor, at a temperature of about reflux, until the reaction is substantially complete, distilling the reaction mixture at a reduced pressure and recovering the keto ester.

4. The method of producing a keto ester in which the carbonyl group is beta to the carboxyl group, which comprises reacting a solution of an alpha chloro ketone with an alkali metal salt of an acid selected from the group consisting of acrylic, alpha alkyl substituted acrylic, cinnamic and alpha phenyl acrylic, in the presence of hydroquinone, at a temperature of between about 100° C. and about 115° C., until the reaction is substantially complete, distilling the reaction mixture at a reduced pressure and recovering the keto ester.

5. The method of producing a keto ester in which the carbonyl group is beta to the carboxyl group, which comprises reacting a solution of an alpha halo ketone with an alkali metal salt of acrylic acid, at a temperature of about reflux, until the reaction is substantially complete, distilling the reaction mixture at a reduced pressure and recovering the keto ester.

6. The method of producing a keto ester in which the carbonyl group is beta to the carboxyl group, which comprises reacting a solution of an alpha halo ketone with an alkali metal salt of methacrylic acid, at a temperature of about reflux, until the reaction is substantially complete, distilling the reaction mixture at a reduced pressure and recovering the keto ester.

7. The method of producing a keto ester in which the carbonyl group is beta to the carboxyl group which comprises reacting a solution of an alpha halo ketone with an alkali metal salt of alpha phenyl acrylic acid, at a temperature of about reflux, until the reaction is substantially complete, distilling the reaction mixture at a reduced pressure and recovering the keto ester.

ALBERT M. CLIFFORD.